United States Patent [19]
Baxter et al.

[11] Patent Number: 5,122,823
[45] Date of Patent: Jun. 16, 1992

[54] FILM CASSETTE LOADING APPARATUS IN A PHOTOGRAPHIC CAMERA

[75] Inventors: Dennis E. Baxter, East Rochester; David C. Smart, Rochester, both of N.Y.

[73] Assignee: Eastman Kodak Company, Rochester, N.Y.

[21] Appl. No.: 699,405

[22] Filed: May 13, 1991

[51] Int. Cl.$^5$ ................................................. G03B 1/00
[52] U.S. Cl. ................................... 354/212; 354/288
[58] Field of Search ................... 354/212, 213–216, 354/275, 288

[56] References Cited

U.S. PATENT DOCUMENTS

| | | | |
|---|---|---|---|
| 2,548,549 | 4/1951 | Mihalyi | 354/288 |
| 3,613,541 | 10/1971 | Beach | 354/212 |
| 3,650,489 | 3/1972 | Bresson et al. | 242/71.2 |
| 3,661,339 | 5/1972 | Shimizu | 242/71.6 |
| 3,728,949 | 4/1973 | Edwards | 354/212 |
| 3,768,747 | 10/1973 | Edwards et al. | 242/71.2 |
| 3,892,354 | 7/1975 | Nagao et al. | 235/91 C |
| 4,052,731 | 10/1977 | Powers | 354/275 |
| 4,363,547 | 12/1982 | Hashimoto et al. | 354/212 |
| 4,841,319 | 6/1989 | Hansen | 354/275 |

Primary Examiner—L. T. Hix
Assistant Examiner—Howard B. Blankenshhip
Attorney, Agent, or Firm—Roger A. Fields

[57] ABSTRACT

In a photographic camera, a cassette carrier having a chamber for receiving a film cassette is movable outwardly from the camera body to permit one to insert and remove the film cassette. A drive spindle for the film cassette and a coaxial gear are rotatably mounted on a spring-urged slider supported on the carrier. Datum projections extend from the camera body to enter the chamber when the carrier is moved to return the chamber to inside the camera body, to shift the cassette from a centered position in engagement with the drive spindle to a datum position in the chamber. Simultaneously, a datum stop located in the camera body abuts the slider to shift the slider with the cassette and to limit the extent to which the coaxial gear will mesh with a driving gear rotatably supported in the camera body.

9 Claims, 16 Drawing Sheets

FILM CASSETTE LOADING APPARATUS IN A PHOTOGRAPHIC CAMERA

BACKGROUND OF THE INVENTION

1. Field of the Invention

The invention relates generally to the field of photography, and in particular to apparatus for loading a film cassette into a photographic camera.

2. Description of the Prior Art

It is generally known as shown in U.S. Pat. Nos. 4,363,547, issued Dec. 14, 1982, and U.S. Pat. No. 4,841,319, issued Jun. 20, 1989, for a photographic camera to include a cassette carrier, such as a door, having an integral chamber for receiving a film cassette. Typically, the carrier is mounted for movement relative to the camera body between a loading position in which the chamber is at least partially removed from the camera body to permit insertion and removal of the film cassette and a normal position in which the chamber is disposed in lighttight relation with the camera body. A drive spindle for rotating a film spool of the film cassette and a coaxial gear are rotatably supported on the carrier. A driving gear is rotatably supported in the camera body for meshing with the coaxial gear to rotate the spindle when the carrier is in its normal position. However, the degree to which the two gears may mesh is not precisely controlled. Thus, for example, should the gears mesh too tightly they might bind or lock.

Usually some means, such as a spring, is provided in the chamber to slightly shift the film cassette from a centered load position to a datum position in order to precisely locate the cassette relative to a film transport path in the camera body. However, the spindle usually remains centered at the bottom of the chamber, that is, it does not shift with the film cassette to the datum position.

SUMMARY OF THE INVENTION

According to one aspect of the invention, there is disclosed an improved photographic camera wherein (a) a cassette carrier having a chamber for receiving a film cassette is mounted for movement relative to a camera body between a loading position in which the chamber is at least partially removed from the camera body to permit insertion and removal of the film cassette and a normal position in which the chamber is disposed in lighttight relation with the camera body, (b) a driven gear is supported on the carrier for rotating a film spool of the film cassette, and (c) a driving gear is supported on the camera body for meshing with the driven gear to rotate the driven gear when the carrier is in its normal position, and wherein the improvement comprises:

datum means projecting from the camera body to enter the chamber when the carrier is in its normal position for shifting the film cassette to a datum position in the chamber; and conveyance means located on the the carrier for supporting the driven gear to move with the film cassette as the film cassette is shifted to its datum position, whereby the driven gear will be maintained in proper relation with the film cassette in order to rotate the film spool.

According to another aspect of the invention, there is disclosed an improved photographic camera wherein (a) a cassette carrier having a chamber for receiving a film cassette is mounted for movement relative to a camera body between a loading position in which the chamber is at least partially removed from the camera body to permit insertion and removal of the film cassette and a normal position in which the chamber is disposed in lighttight relation with the camera body, (b) a driven gear is supported on the carrier for rotating a film spool of the film cassette, and (c) a driving gear is supported on the camera body for meshing with the driven gear to rotate the driven gear when the carrier is in its normal position, and wherein the improvement comprises:

respective cooperating means located on the camera body and the carrier to be spaced from each other when the carrier is in its loading position and to abut one another when the carrier is in its normal position for limiting the extent to which the driven gear and the driving gear will mesh.

DETAILED DESCRIPTION OF THE PREFERRED EMBODIMENT

The invention is disclosed as being embodied preferably in a 35 mm still-film camera. Because the features of this type of camera are generally well known, the description which follows is directed in particular to elements forming part of or cooperating directly with the disclosed embodiment. It is to be understood, however, that other elements not specifically shown or described may take various forms known to persons of ordinary skill in the art.

THE FILM CASSETTE

Figure 1:
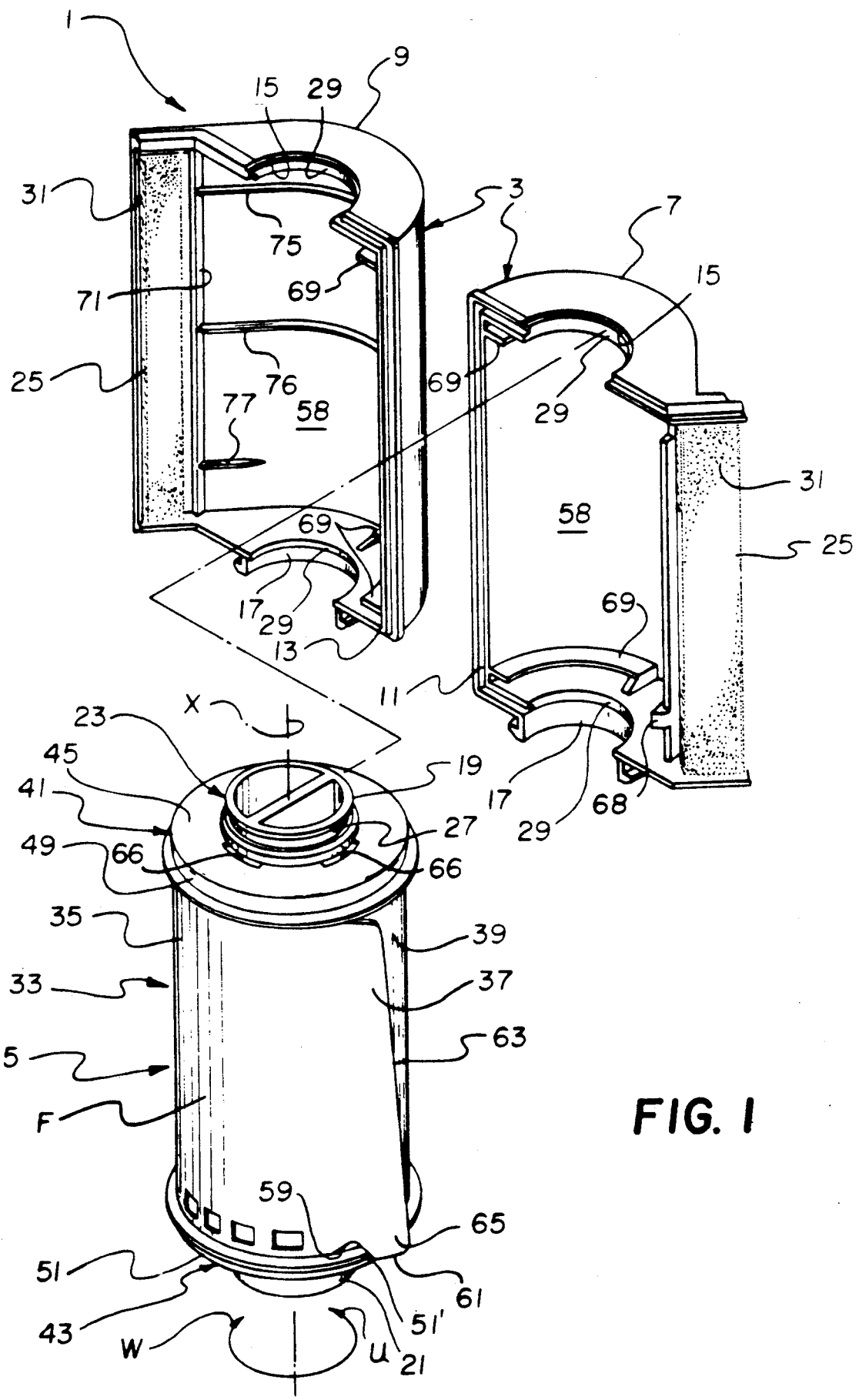
FIG. 1 is an exploded perspective view of a film cassette.
Figure 2:
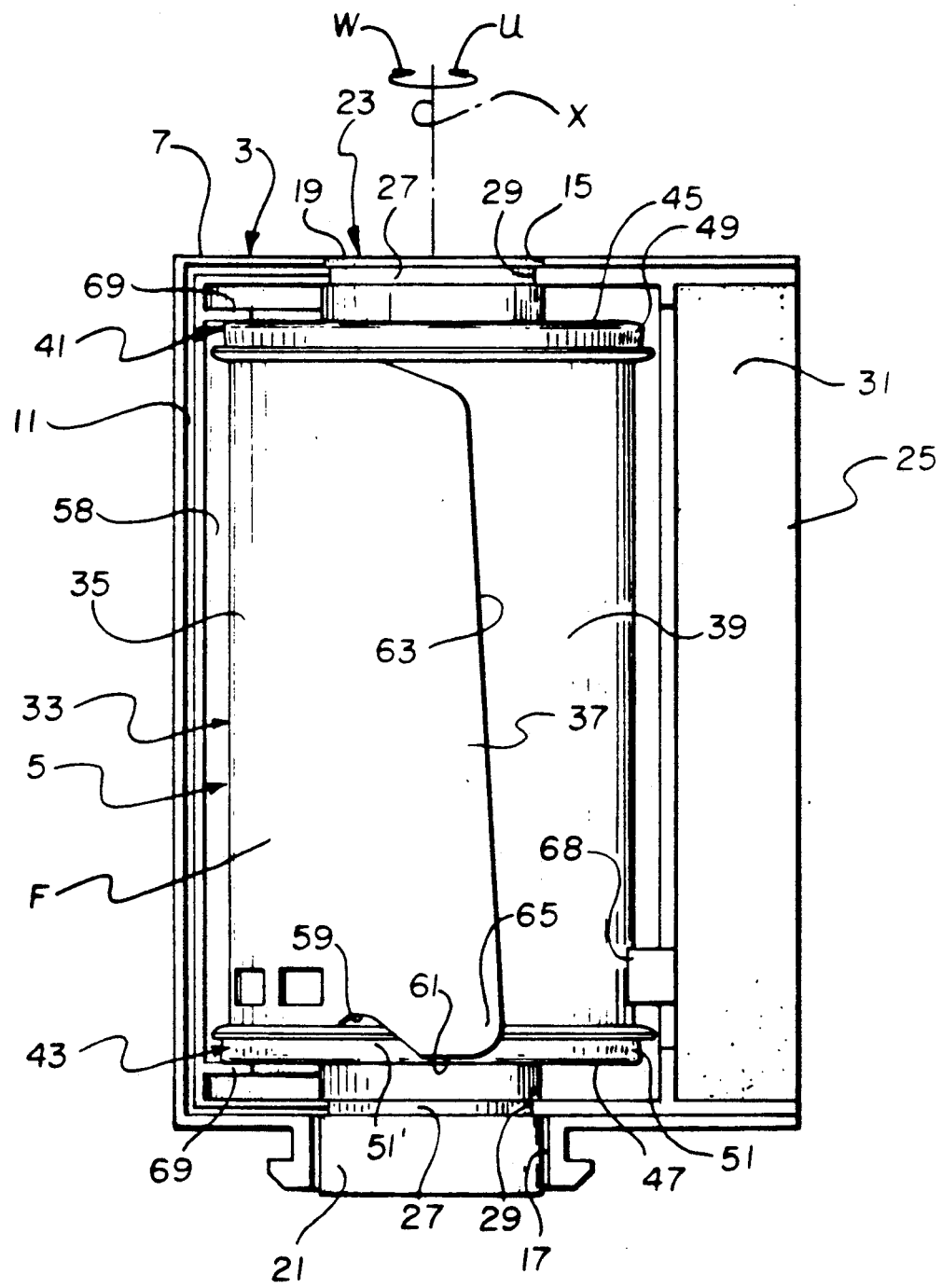
FIG. 2 is an elevation view of the film cassette, illustrating the cassette shell open to reveal a film roll coiled about a film spool.
Figure 12:
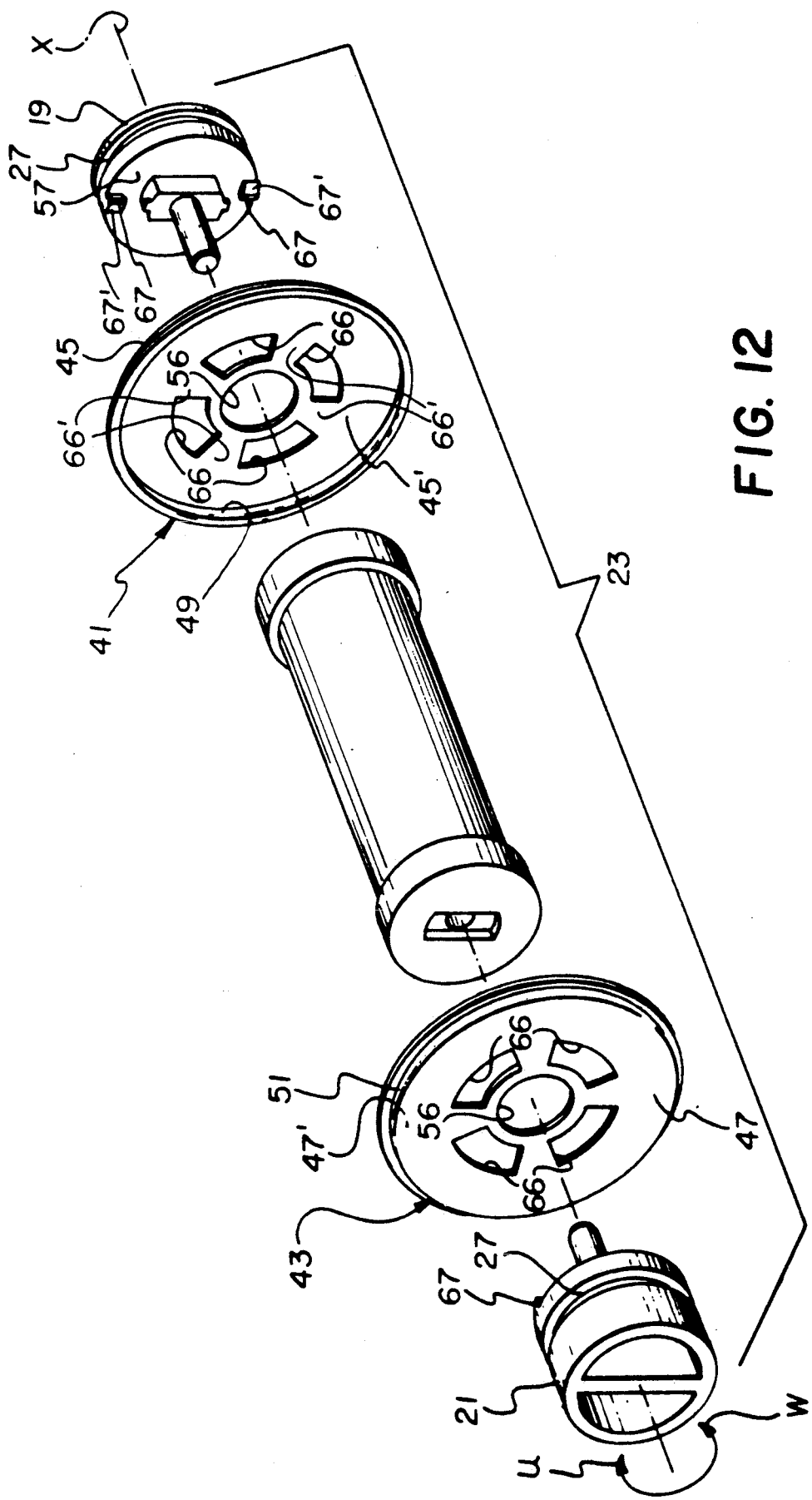
FIG. 12 is an exploded perspective view of the film spool without the film roll.

Referring now to the drawings, FIGS. 1, 2 and 12 depict an improved 35 mm film cassette 1 comprising a light-tight cassette shell 3 and a film spool 5 which is rotatable about an axis X in film unwinding and winding directions U and W within the cassette shell. The cassette shell 3 consists of two shell halves 7 and 9 which are mated along respective grooved and stepped edge portions 11 and 13. The mated halves 7 and 9 define upper and lower aligned circular openings 15 and 17 for relatively shorter and longer opposite open-end pieces 19 and 21 of a spool core or hub 23, and they define a narrow relatively-straight film passageway 25 to the exterior of the cassette shell 3. The longer and shorter open-end pieces 19 and 21 of the spool core 23 each include an annular peripheral groove 27 which mates with a corresponding edge portion 29 of the respective openings 15 and 17 in the cassette shell 3 to rotatably support the film spool 5 for rotation about the axis X in the film unwinding and winding directions U and W. A known black velvet or plush material 31 lines the interior of the film passageway 25 to prevent ambient light from entering the film passageway.

Figure 3:
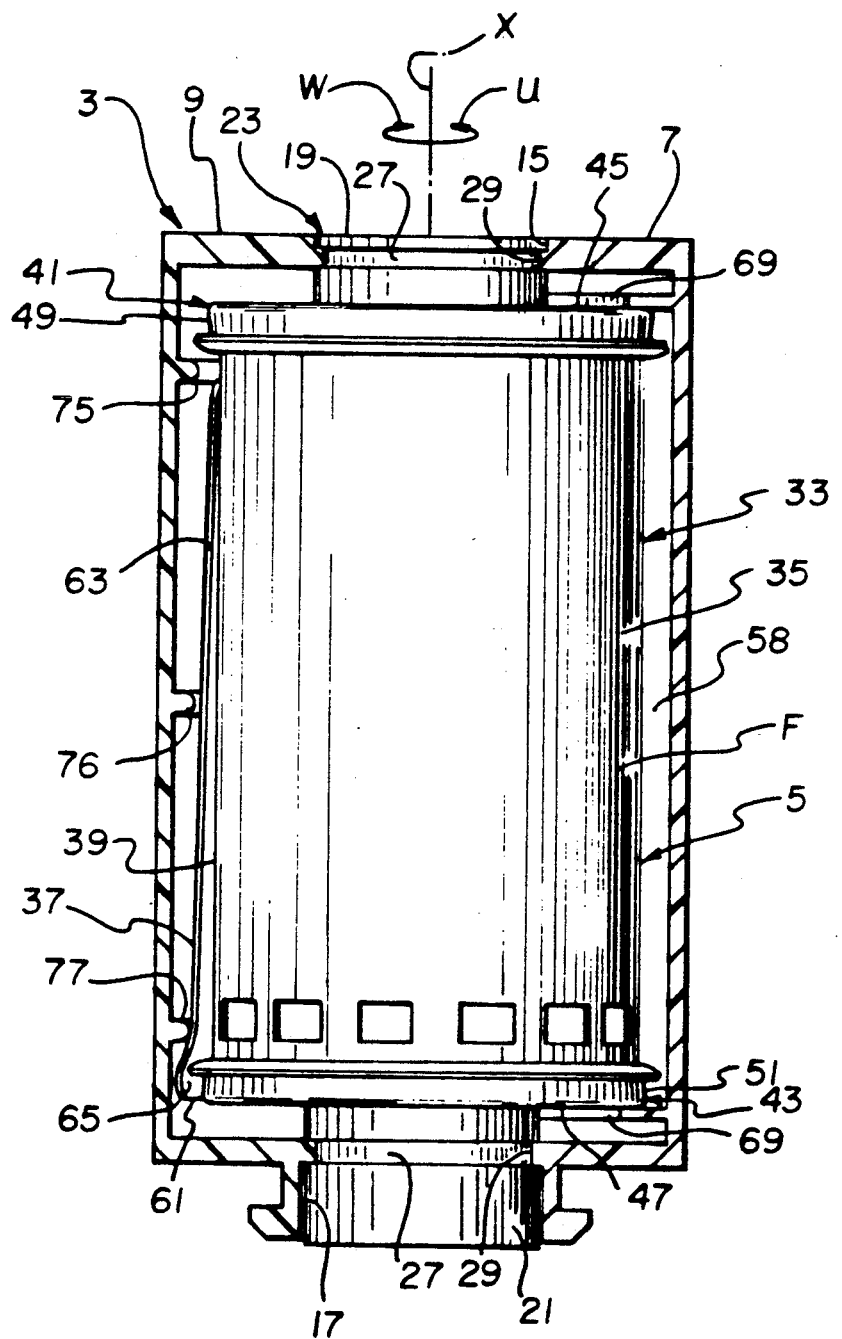
FIG. 3 is an elevation view similar to FIG. 2, through in section.
Figure 13:
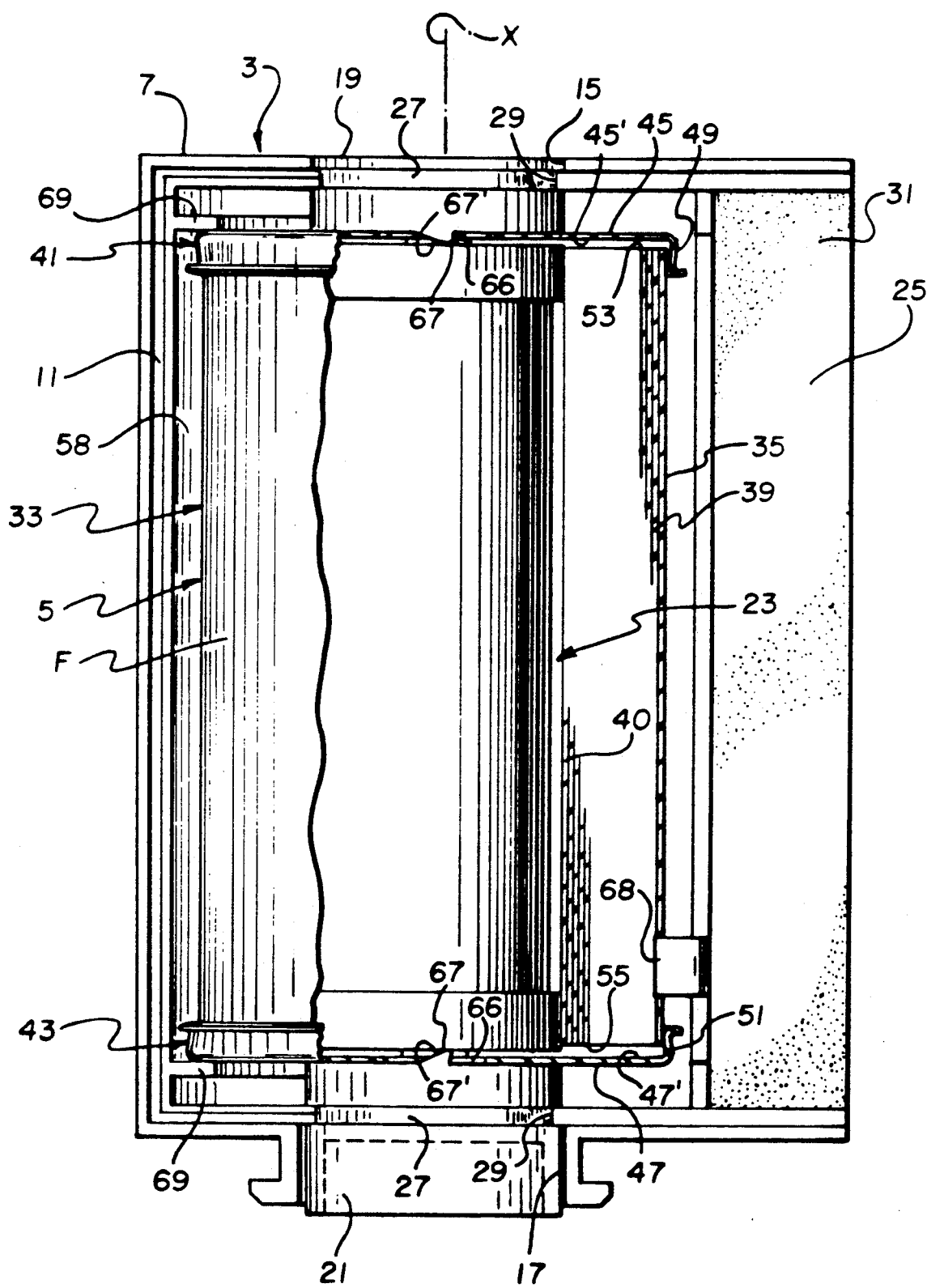
FIG. 13 is an elevation view partly in section of the film roll and the film spool, illustrating the manner in which a pair of film confining flanges of the spool may be fixed via respective engagement hooks to the spool for concurrent rotation with the spool.

A roll 33 of 35 mm filmstrip F is coiled about the spool core 23 to form successive film convolutions. As shown in FIG. 3, the film roll 33 includes an outermost convolution which comprises a film leader 35 having a leading or forward end 37, and it includes a next-inward convolution 39 coiled behind the outermost convolution. The inner or trailing end of an innermost convolution 40 of the film roll 33 is secured to the spool core 23 using known attachment means, not shown. See FIG. 13.

Figure 9:
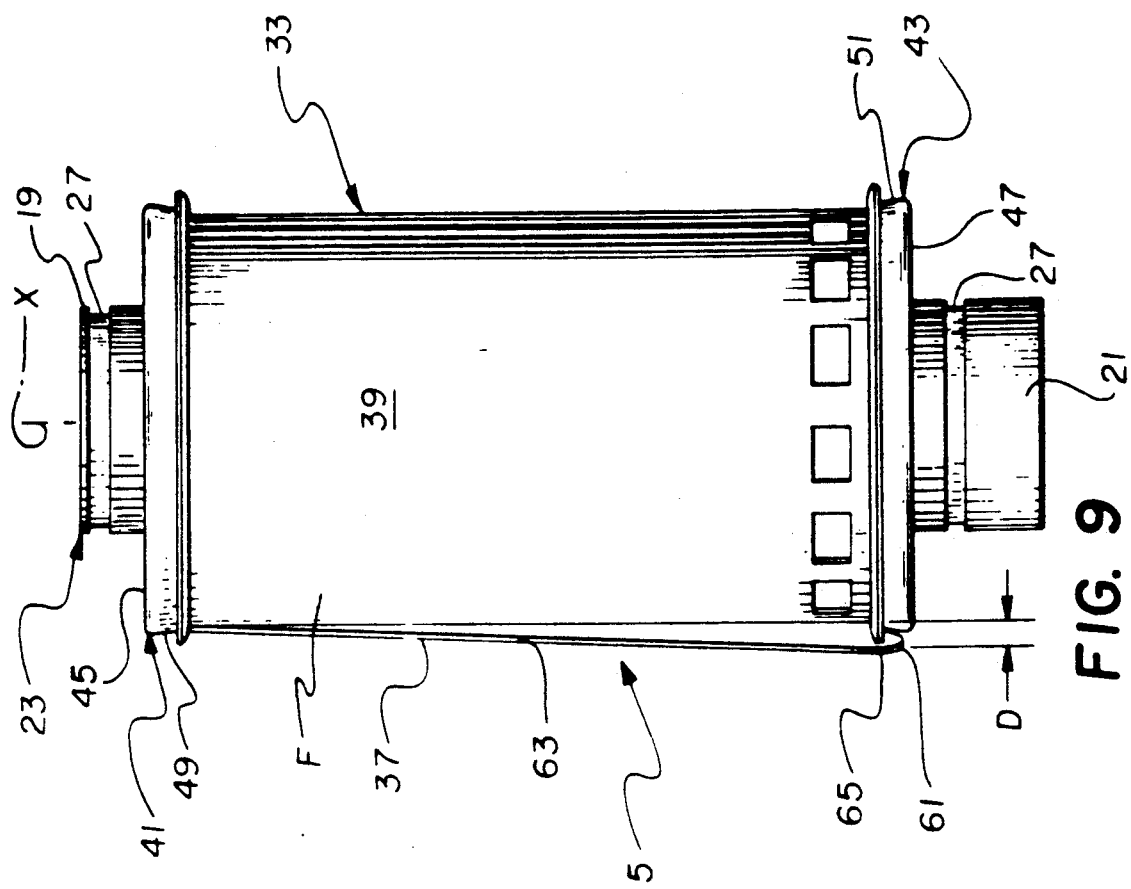
FIGS. 8 and 9 are elevation views of the film roll and the film spool, illustrating the manner in which the film roll is originally stored on the film spool.
Figure 8:
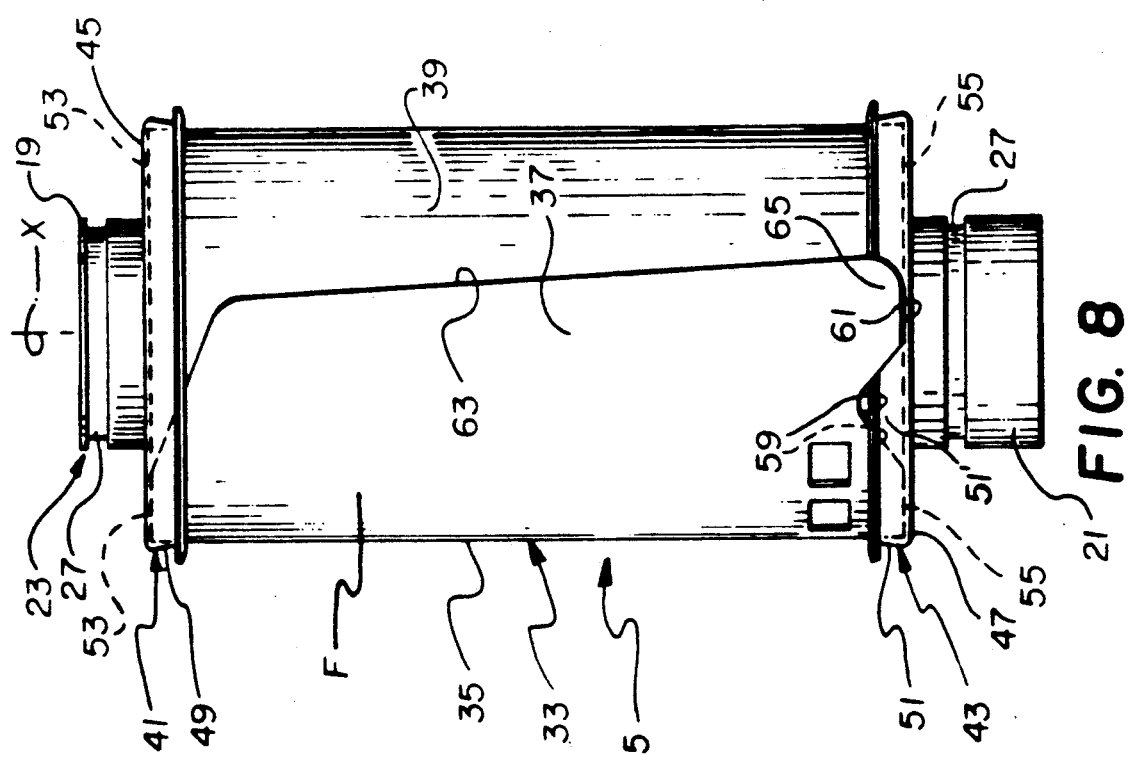
Figure 14:
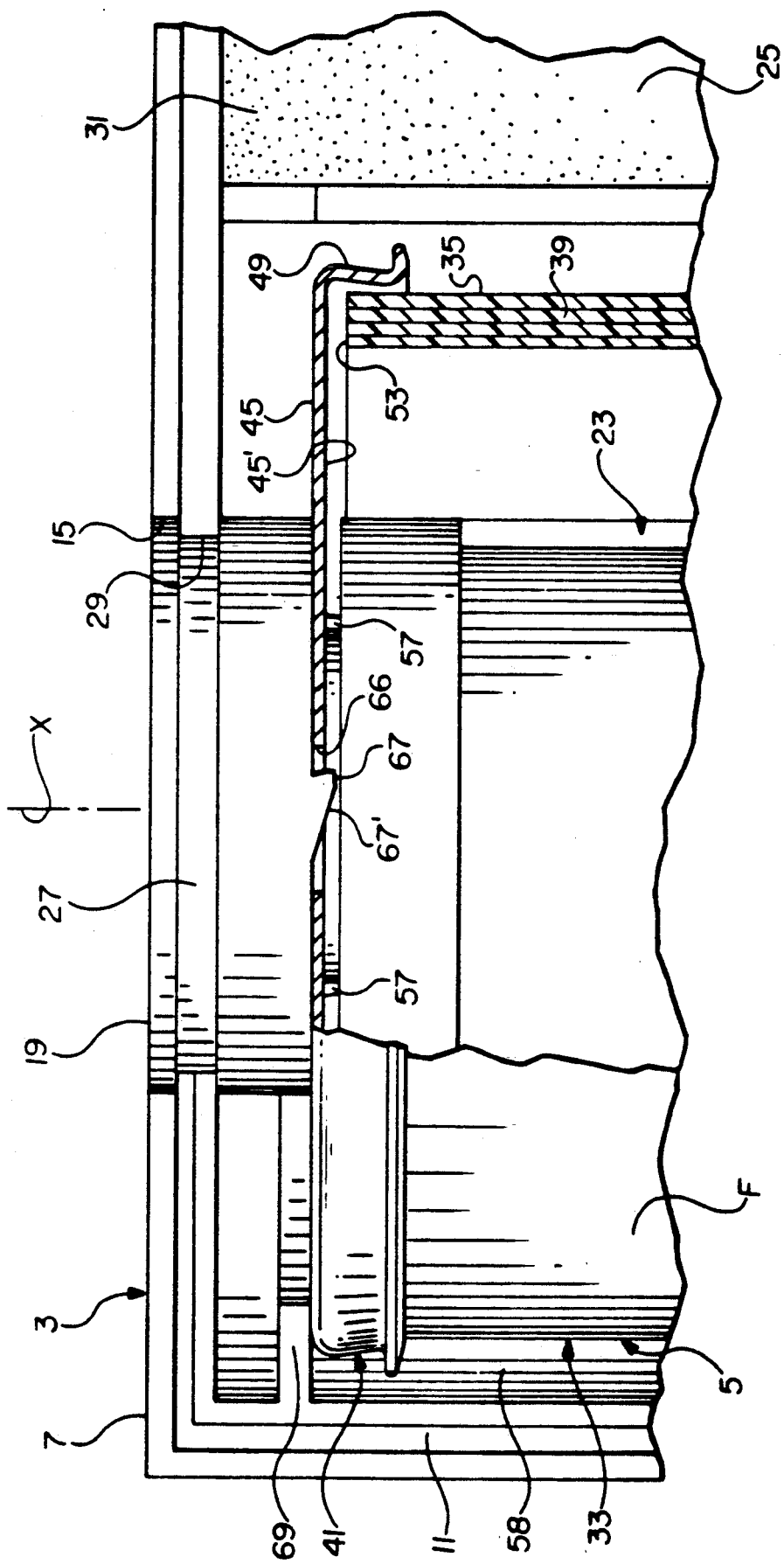
FIG. 14 is a blow-up of a particular portion of FIG. 13, illustrating one of the engagement hooks engaging one of the film confining flanges.
Figure 15:
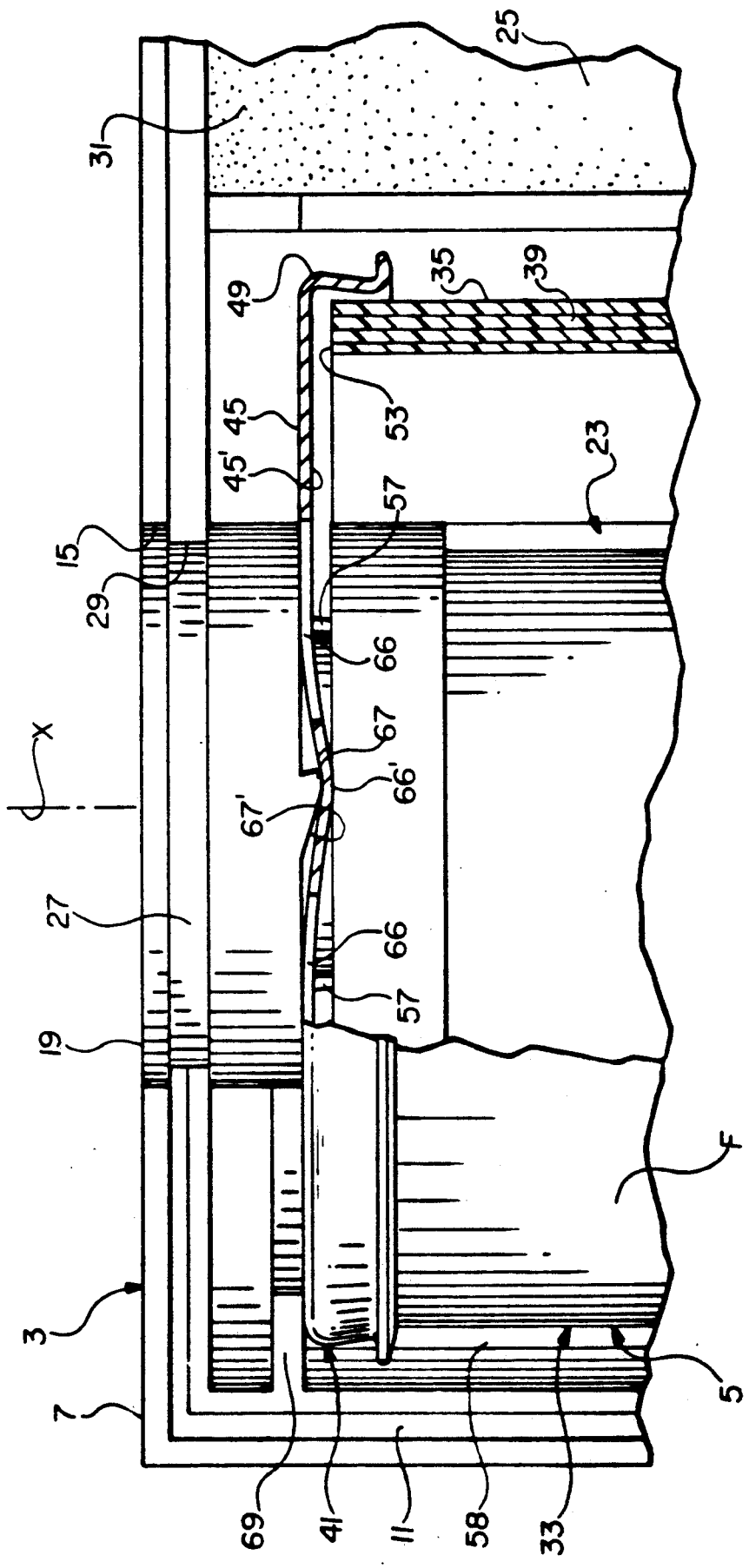
FIG. 15 is a blow-up similar to FIG. 14, illustrating the engagement hook not engaging the film confining flange.

A pair of upper and lower identical, very thin, flexible film constraining flanges 41 and 43 are coaxially spaced along the spool core 23 as shown in FIGS. 1, 2, 8, 12 and 13. The two flanges 41 and 43 comprise respective integral disks 45 and 47 and respective integral annular lips or skirts 49 and 51 which circumferentially extend from the disks. The two disks 45 and 47 cover opposite substantially flat sides of the film roll 33 which are defined by corresponding opposite longitudinal edges 53 and 55 of each successive convolution of the film roll, and they have respective central holes 56 through which the spool core 23 coaxially extends to permit rotation of the spool core relative to the flanges 41 and 43. Respective pairs of supports 57, 57 and 57, 57 are fixed to the spool core 23 to support the flanges 41 and 43 at their disks 45 and 47. See FIGS. 12-14. The two pairs of supports 57, 57 and 57, 57 are sufficiently spaced from one another along the spool core 23 to maintain respective inner faces 45' and 47' of the disks 45 and 47 spaced from the longitudinal edges 53 and 55 of each successive convolution of the film roll 33. See FIG. 13. The annular lips 49 and 51 overlap the film leader (outermost convolution) 35 of the film roll 33 radially outwardly of the longitudinal edges 53 and 55 of the leader to radially confine the leader to thus prevent it from radially expanding or clock-springing into substantial contact with an interior curved wall 58 of the cassette shell 3. A lip-receiving notch 59 is cut in the film leader (outermost convolution) 35 along its longitudinal edge 55, relatively close to its leading end 37, to receive a peripheral section 51' of the annular lip 51. This allows a relatively short edge-section 61 of the film leader (outermost convolution) 35 connecting the leading end 37 and the notch 59 to overlap the annular lip 51 radially outwardly to thus maintain the leading end spaced a radial distance D from the next-inward convolution 39 of the film roll 33. See FIGS. 4 and 9. The leading end 37 has a forward edge 63 inclined from the longitudinal edge 53 of the film leader (outermost convolution) 35 to the other longitudinal edge 55 of the leader to form a forward-most tip or tab 65 of the leader which, like the edge-section 61, overlaps the annular lip 51 radially outwardly. See FIGS. 1, 2, 8 and 9.

The two flanges 41 and 43 have a plurality of concentric arcuate slots 66 cut in their respective disks 45 and 47 to longitudinally extend in the film unwinding and film winding directions U and W. Engagement means in the form of respective hook-like members 67, located on the short and longer open-end pieces 19 and 21 of the spool core 23, are normally located in the concentric slots 66 for movement along the slots into engagement with the flanges 41 and 43 responsive to rotation of the spool core relative to the flanges in the unwinding direction U and for movement along the slots out of engagement with the flanges responsive to rotation of the spool core relative to the flanges in the winding direction W. See FIGS. 12-15. Preferably, each of the hook-like members 67 has an end face 67' that is beveled to ease the hook-like member out of one of the concentric slots 66 responsive to rotation of the spool core 23 relative to the flanges 41 and 43 in the winding direction W, in the possible event the spool core is rotated relative to the flanges far enough in the winding direction to back the hook-like member out of the slot.

The two pairs of supports 57, 57 and 57, 57 are positioned to distort the flanges 41 and 43 at their disks 45 and 47 when the hook-like members 67 are not in the slots 66. See FIG. 15. More specifically, in this instance, the two pairs of supports 57, 57 and 57, 57 distort the flanges 45 and 47 in a manner such that respective flat areas 66' of the disks located between the slots 66 are urged firmly against the hook-like members 67. This will ensure that the hook-like members 67 are received in the slots 66 when the spool core 23 is rotated relative to the flanges 45 and 47 in the unwinding direction W, and thus will engage the flanges. See FIG. 14.

Figure 4:
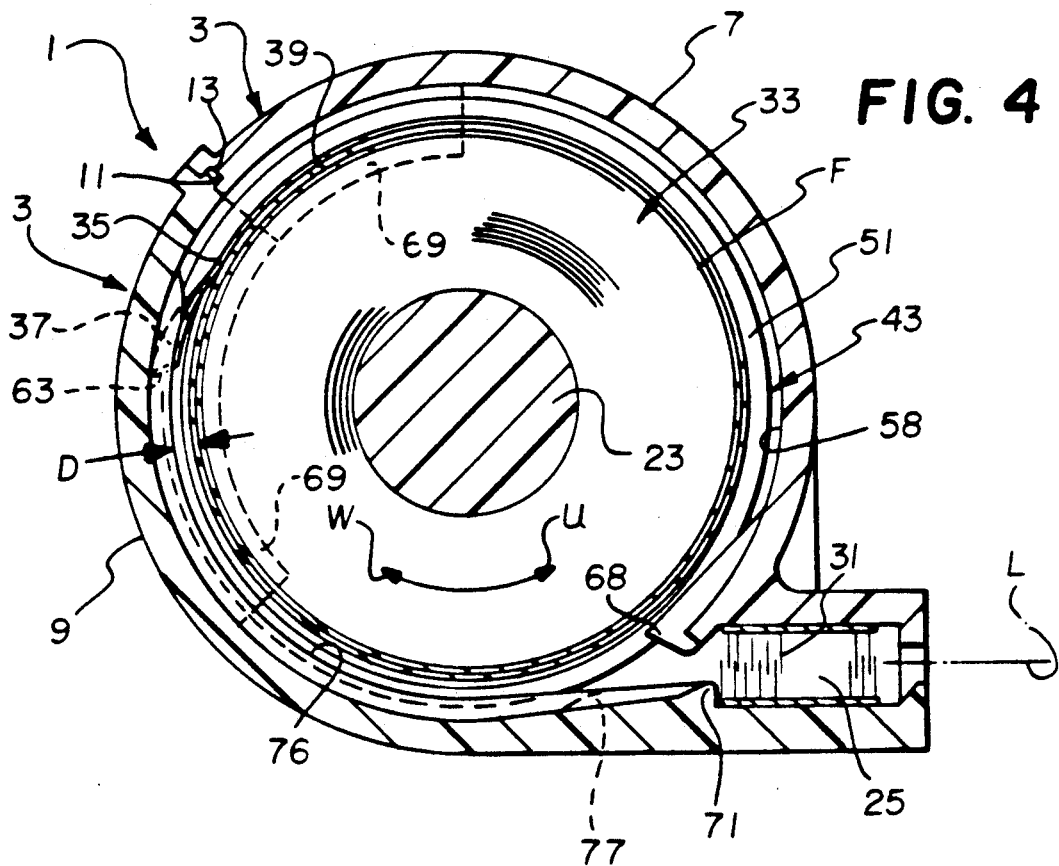
FIG. 4 is an end view partly in section of the cassette shell, the film roll and the film spool, illustrating the manner in which the film roll is originally stored on the film spool.
Figure 5:
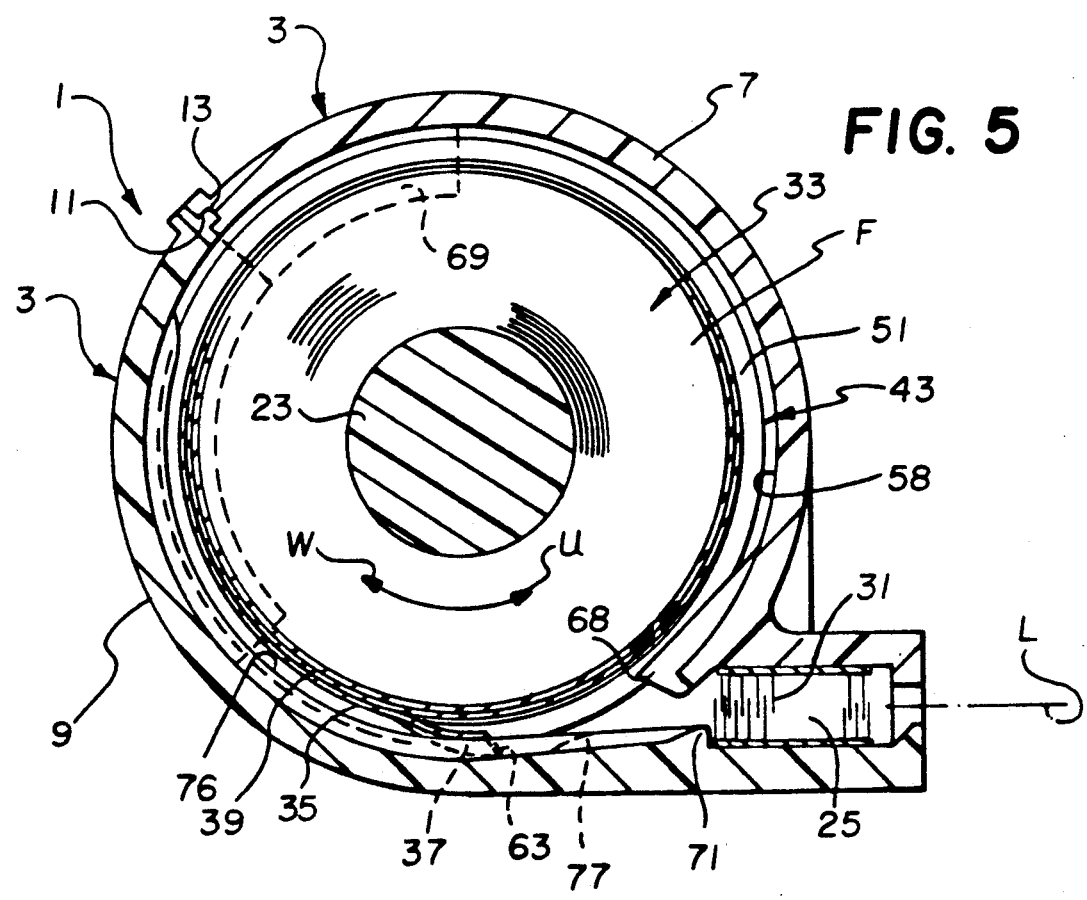
FIGS. 5, 6, and 7 are end views similar to FIG. 4, illustrating the manner in which the film roll is unwound from the film spool.

A film stripper-guide 68 projecting from the interior wall 58 of the cassette half 7 is positioned immediately inward of the inner entrance to the film passageway 25 to be received between the leading end 37 of the film leader (outermost convolution) 35 and the next-inward convolution 39, close to the forward-most tip 65 of the leader, to pick up the leading end and guide it into the film passageway responsive to rotation of the spool core 23 in the unwinding direction U. See FIGS. 1 and 4-7. The leading end 37 will be advanced over the stripper-guide 68 and into the film passageway 25, rather than between the stripper-guide and the next-inward convolution 39, because it is spaced the radial distance D from the latter convolution. Thus, as shown in FIG. 4, the leading end 37 will be located within range of the stripper-guide 68 due to such spacing D from the next-inward convolution 39.

Figure 10:
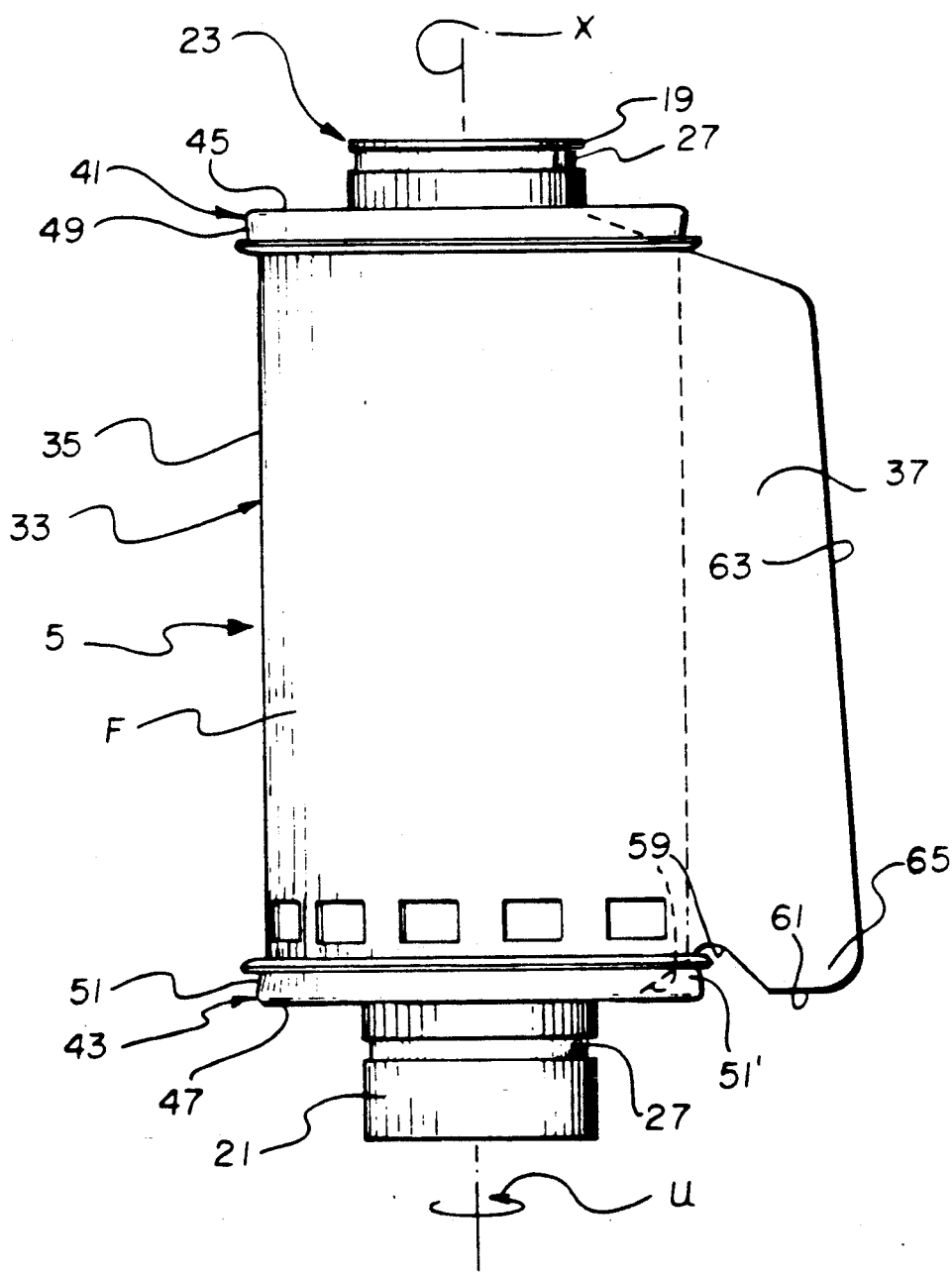
FIGS. 10 and 11 are elevation views similar to FIGS. 8 and 9, illustrating the manner in which the film roll is unwound from the film spool.

When the leading end 37 of the film leader (outermost convolution) 35 is advanced over the stripper-guide 68 responsive to rotation of the spool core 23 in the unwinding direction U, the longitudinal edges 53 and 55 of the leader start to gently flex respective arcuate portions of the two flanges 41 and 43 away from one another, i.e. farther apart, first to allow the notch 59 to separate from the lip section 51', and then to allow successive longitudinal sections of the leader to uncoil from between the flanges and exit to the outside of the cassette shell 3. See FIGS. 10 and 11. The flexing of the flanges 41 and 43 occurs because the film width $W_F$ between the longitudinal film edges 53 and 55 is slightly greater than the axial spacing $A_S$ between the annular lips 49 and 51. Moreover, successive convolutions of the film roll 33 have a resistance to transverse bowing that is greater than the resistance of the flanges 41 and 43 to be flexed. Two pairs of flat curved bearing members 69 project from the interior walls 58 of the respective shell halves 7 and 9 to lie flatly against successive arcuate portions of the two disks 45 and 47 as the flanges 41 and 43 are flexed away from one another, to only allow those flange portions separated from the bearing members to be flexed farther apart. See FIGS. 1, 2 and 4. The bearing members 69 are positioned relatively remote from the film passageway 25. Thus, the leader 35 is only allowed to uncoil from between the flanges 41 and 43 relatively close to the passageway 25. See FIG. 7.

A film flattening rib 71 projects from the interior wall 58 of the cassette half 9 in the vicinity of the inner entrance to the film passageway 25 and the stripper-guide 68 to support successive longitudinal sections of the film leader 35, beginning with its leading end 37, substantially flat widthwise as those sections are freed from the flanges 41 and 43, to facilitate movement of the leading end into the passageway. See FIG. 7. The light-trapping plush 31 within the film passageway 25 is elevated along the passageway slightly beyond a longitudinal center line L of the passageway. The film flattening rib 71 as shown in FIG. 4 projects almost to the center line L in order to support successive sections of the film leader 35 substantially flat at the center line. Preferably, the film-supporting tip or longitudinal edge of the flattening rib 71 is spaced 0.005"-0.030" short of the center line L.

Two substantially parallel curved film supporting ribs 75 and 76 project from the interior wall 58 of the cassette half 7 to longitudinally extend from the film flattening rib 71 to part-way between the pair of bearing members 69 which project from the same wall. See FIGS. 1, 3, and 4. The film supporting ribs 75 and 76 longitudinally extend the entire location at which the film leader (outermost convolution) 35 can escape the confinement of the flanges 41 and 43, when the leader axially flexes the flanges away from one another. The film supporting ribs 75 and 76 as shown in FIG. 3 are positioned to be slightly spaced from the film leader 35, when the leader is confined within the annular lips 49 and 51. Another film supporting rib 77 projects from the interior wall 58 of the cassette half 7, opposite the stripper-guide 68. The other rib 77 is substantially parallel to and shorter than the first-two ribs 75 and 76. All three of the ribs 75-77 longitudinally extend perpendicular to and adjoin the flattening rib 71. See FIG. 1.

THE CASSETTE OPERATION

Figure 6:
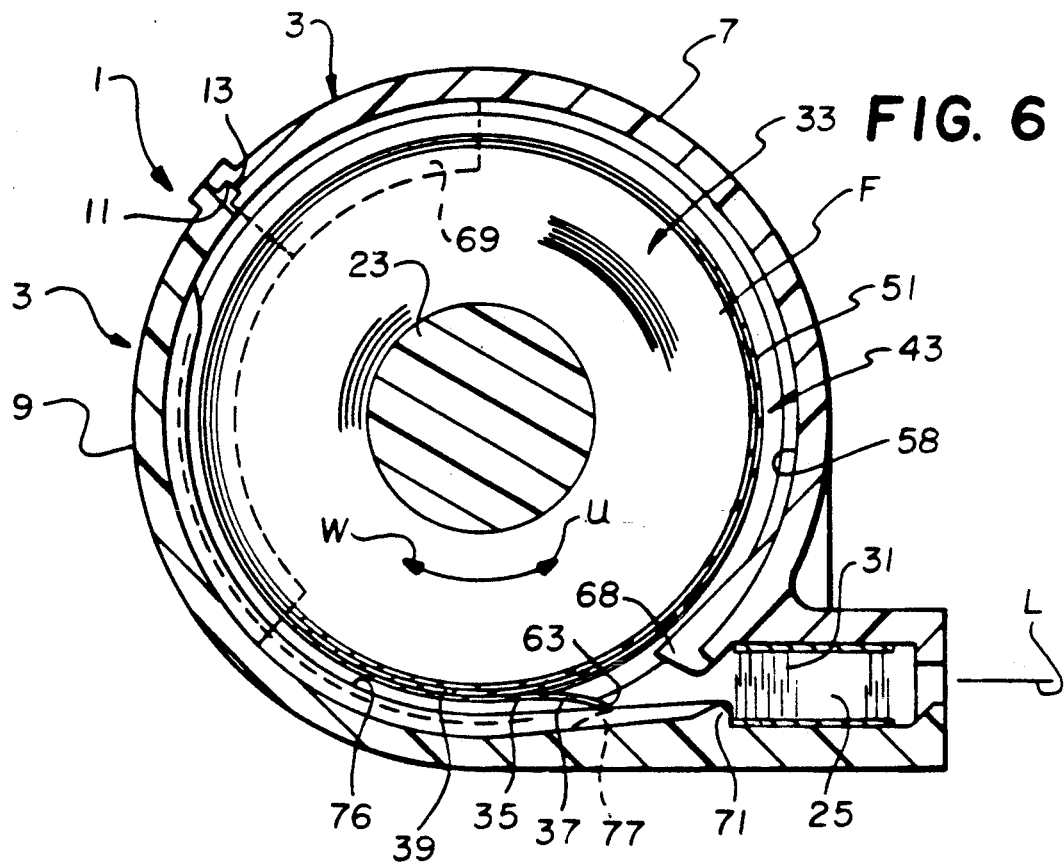
Figure 7:
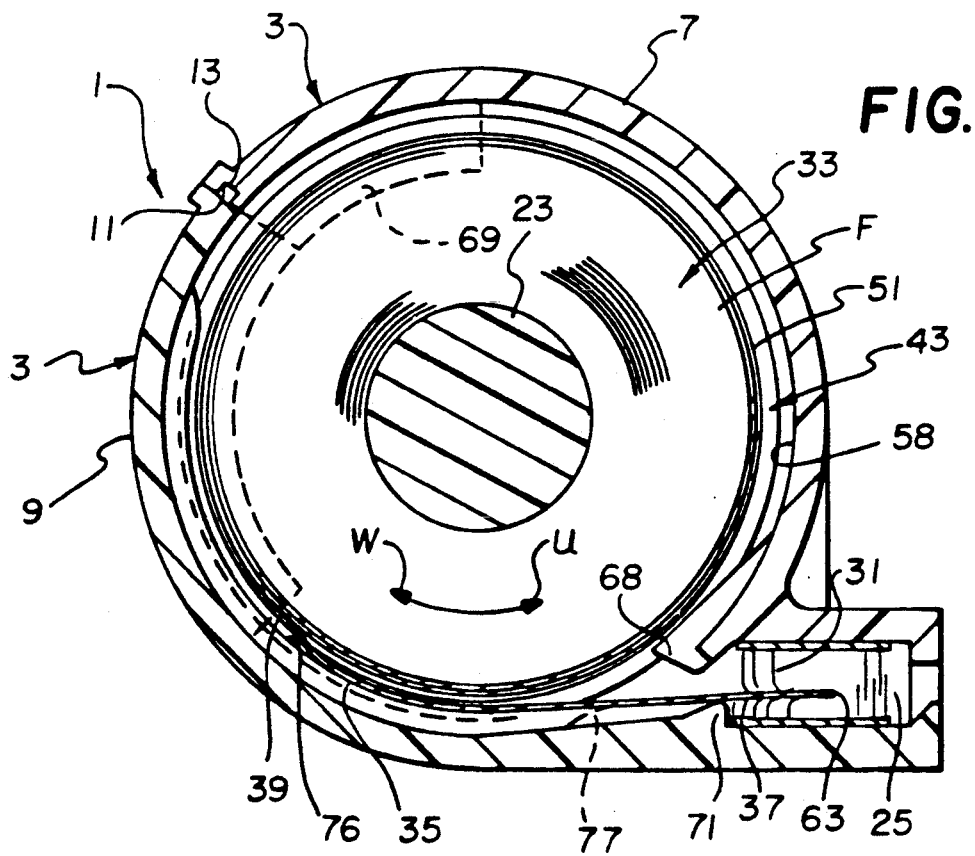
Figure 11:
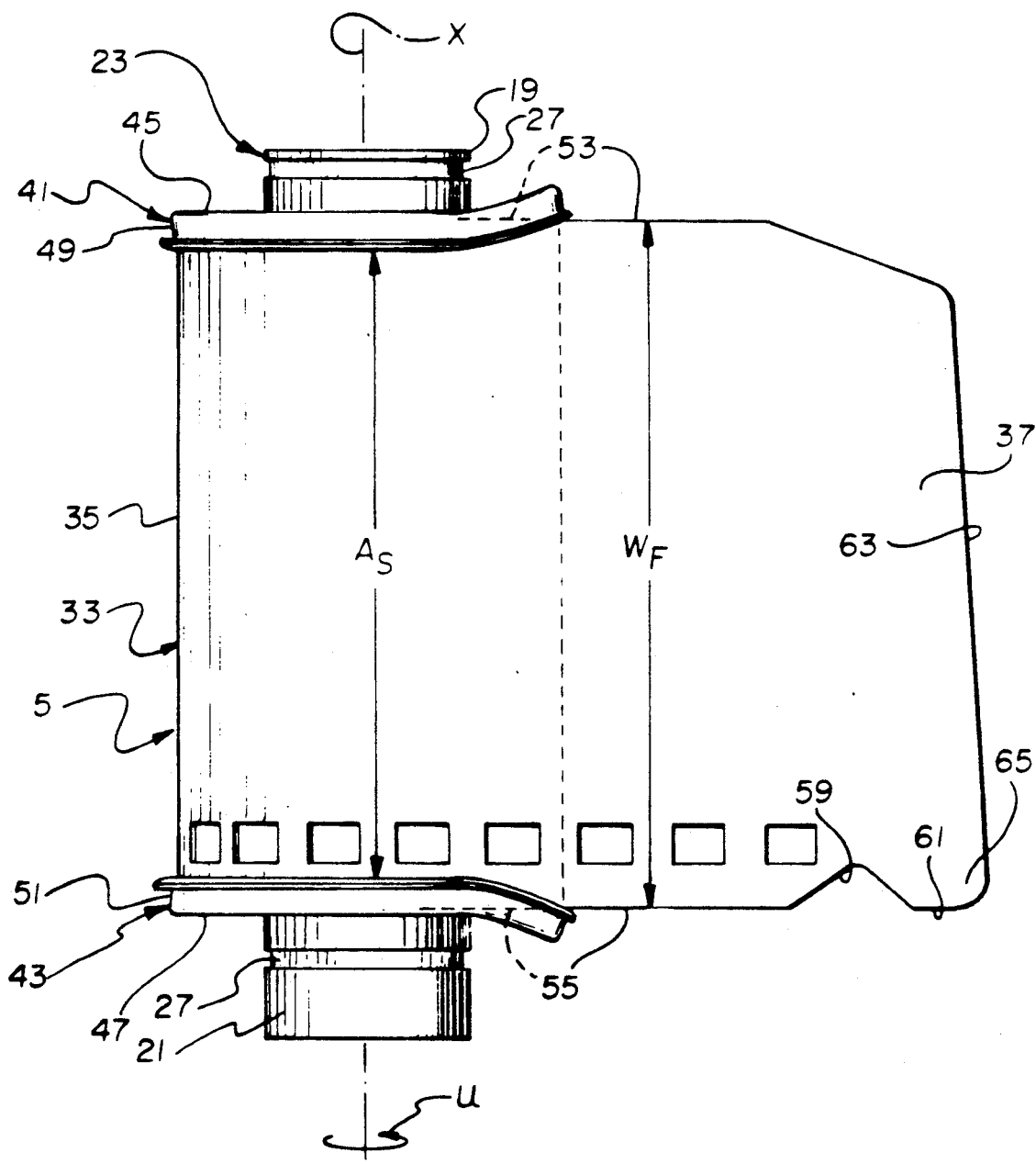

When the spool core 23 is initially rotated in the film unwinding direction U, the two flanges 41 and 43 momentarily tend to remain stationary and the film roll 33, since its inner end is attached to the spool core, will expand radially or clock-spring to force the film leader (outermost convolution) 35 firmly against the annular lips 49 and 51 of the flanges. Generally however, before the film roll 33 can be expanded radially to the extent a non-slipping relation would be created between the film leader (outermost convolution) 35 and the annular lips 49 and 51, the hook-like members 67 will have moved along the respective slots 66 (or from the flat areas 66' into the slots 66, and then) into engagement with the two flanges 41 and 43 to fix the flanges to the spool core. Then, further rotation of the spool core 23 will similarly rotate the flanges 41 and 43. As a result, the leading end 37 of the film leader (outermost convolution) 35 will be advanced over the shorter rib 77 and the stripper-guide 68, causing successive arcuate portions of the flanges 41 and 43 to be flexed away from one another as shown in FIG. 11. This first allows the notch 59 to separate from the lip section 51', and then it allows successive longitudinal sections of the film leader 35 to exit from between the flanges to the outside of the cassette shell 3. Since the stripper-guide 68 initially picks up the leading end 37 of the film leader 35 close to its forward-most tip 65, the forward edge 63 of the leading end will move against the film flattening rib 71 as shown in FIG. 6.

When the film leader 35 is thrust through the film passageway 25 to the outside of the cassette shell 3, the passageway due to the plush material 31 presents some resistance to outward movement of the leader. This resistance causes the leader 35 to further flex the flanges 41 and 43 away from one another to, in turn, allow more of the leader to uncoil from between the flanges. If the two ribs 75 and 76 were omitted from the shell half 9, the leader 35 would uncoil against the interior wall 58 of the shell half. As a result, increased torque would be required to rotate the spool core 23 in the film unwinding direction U. However, the two ribs 75 and 76 serve to severely limit the extent to which the leader 35 can uncoil from between the flanges 41 and 43.

THE CASSETTE LOADING APPARATUS

Figure 16:
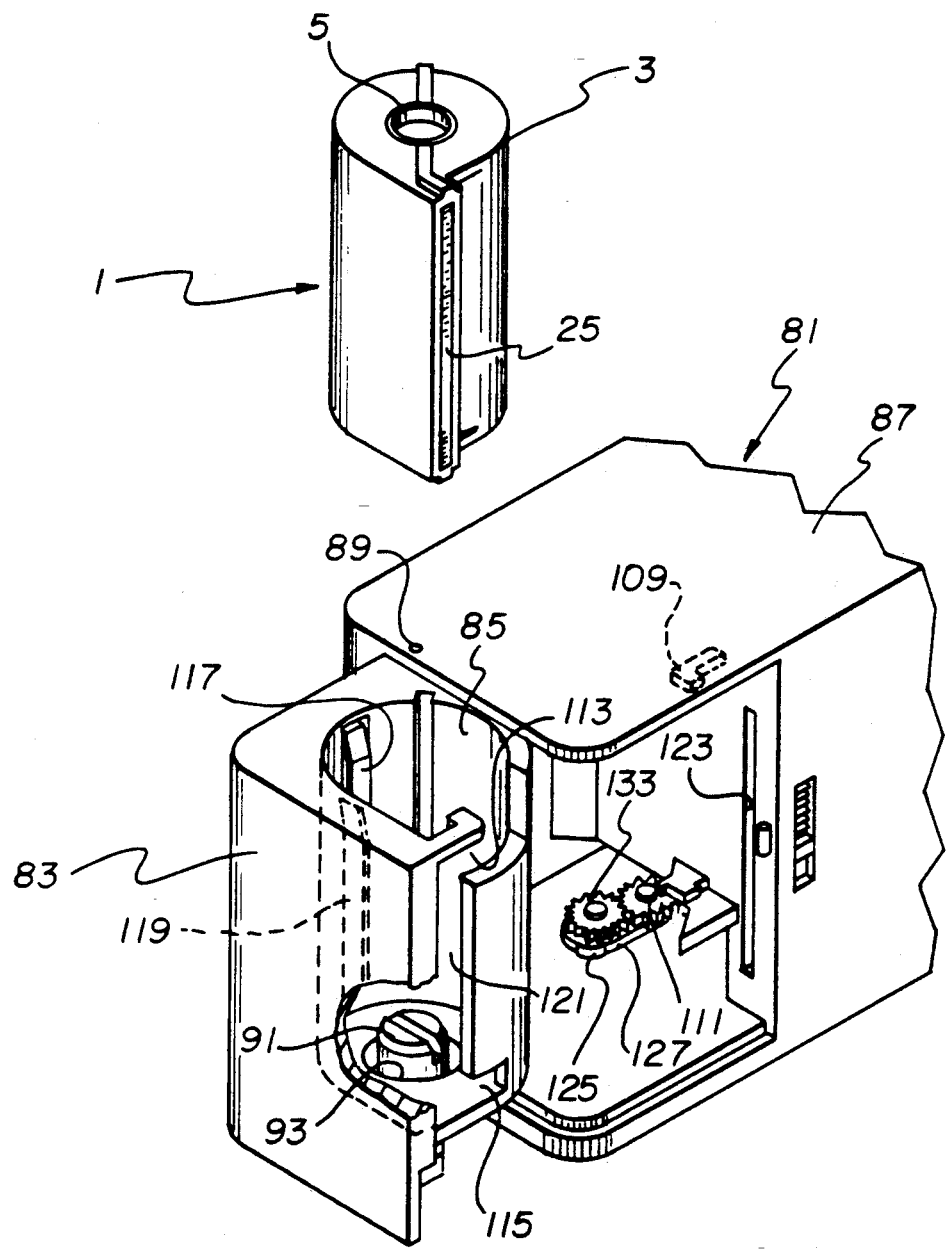
FIG. 16 is a perspective view of apparatus for loading the film cassette depicted in FIGS. 1-15 into a chamber of a photographic camera according to a preferred embodiment of the invention, showing a door or carrier of the apparatus open.
Figure 17:
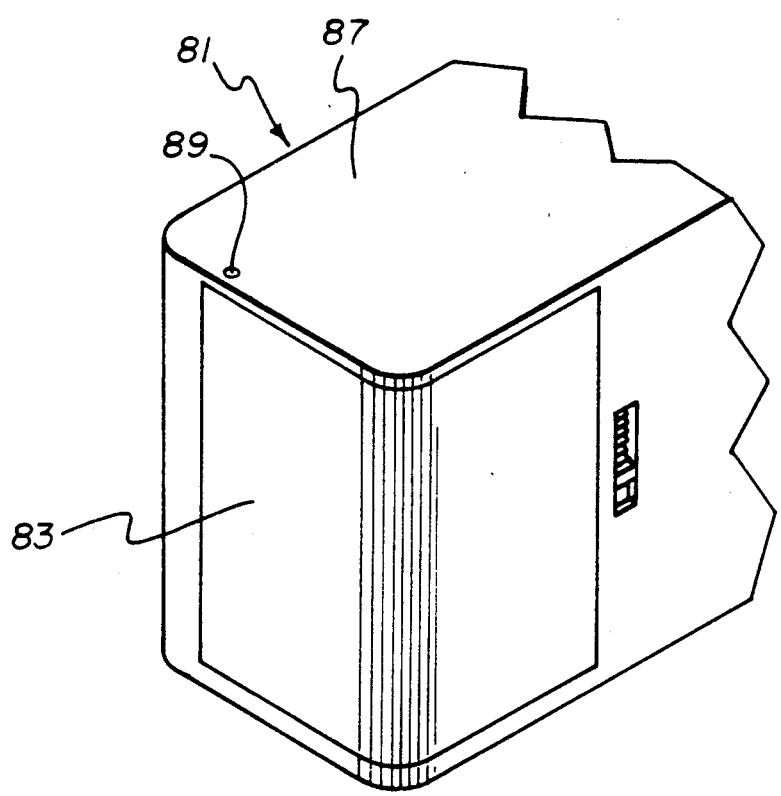
FIG. 17 is a perspective view similar to FIG. 16, showing the door closed.
Figure 18:
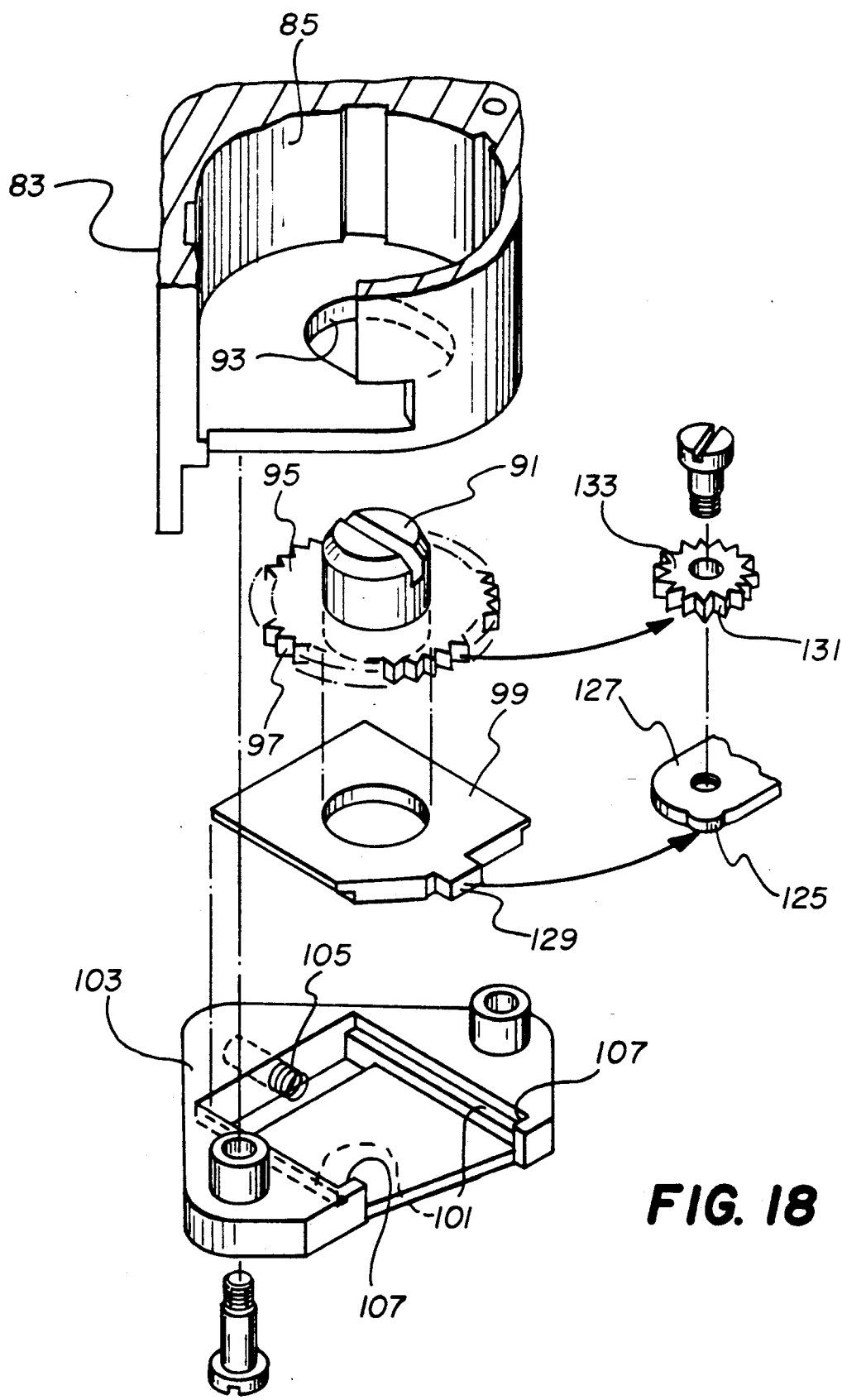
FIG. 18 is an exploded perspective view of the apparatus.
Figure 20:
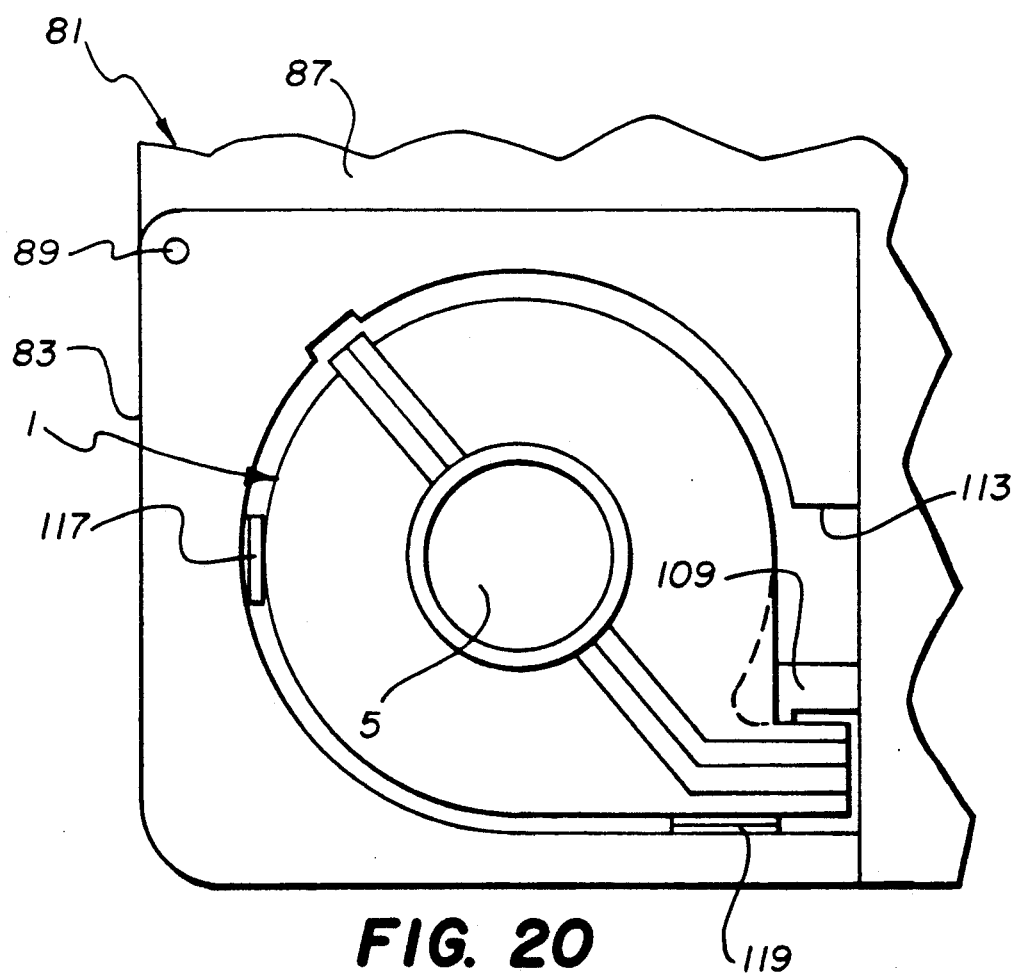
FIG. 20 is a plan view of the chamber.

FIG. 16 shows a photographic camera 81, in part, including a cassette carrier or door 83 having an open chamber 85 for receiving the film cassette 1 axially, i.e. end first. The carrier 83 is connected to the camera body 87 via a pivot pin 89 to support the carrier for swinging movement between a loading position, shown in FIGS. 16 and 18, in which the chamber 85 is outside the camera body to permit insertion and removal of the film cassette 1 and a normal or concealed position, shown in FIGS. 17 and 20, in which the chamber is disposed in lighttight relation with the camera body. A typical drive spindle 91 for engaging the film spool 5 of the film cassette 1 to rotate the film spool in the unwinding and winding directions U and W protrudes into the chamber 85 through a central opening 93 in the bottom of the chamber as shown in FIGS. 16 and 18. A driven gear 95 having a continuous series of peripheral teeth 97 is coaxially fixed to the spindle 91 and is rotatably supported in a known manner on a slider 99. The slider 99 as shown in FIG. 18 rests on a pair of parallel rails or guides 101 formed along a bottom plate 103 of the carrier 83. A compression spring 105 urges the slider 99 to translate to a centered position against a pair of stops 107 at respective similar ends of the rails 101 in which the spindle 91 is substantially centered in the chamber 85 to engage the film spool 5 of the film cassette 1.

When the film cassette 1 is inserted into the chamber 85 and its film spool 5 is engaged with the drive spindle 91, the cassette will be located in a centered position in the chamber. If the carrier 83 is then swung from its loading position, shown in FIGS. 16 and 18, to its normal position, shown in FIGS. 19 and 20, two datum projections 109 and 111 which extend from the camera body 87 will be received in the chamber through respective narrow openings 113 and 115 to the chamber. The datum projections 109 and 111 slightly shift the film cassette 1 from its centered position to a datum position, shown in FIG. 20, in which they hold the cassette firmly against two leaf springs 117 and 119 in the chamber 85. See FIG. 20. In the datum position, the film cassette 1 has its film passageway 25 precisely aligned with a narrow opening 121 to the chamber 85. The narrow opening 121, in turn, is precisely aligned with a film ingress/egress slit 123 in the camera body 87. See FIG. 16.

Figure 19:
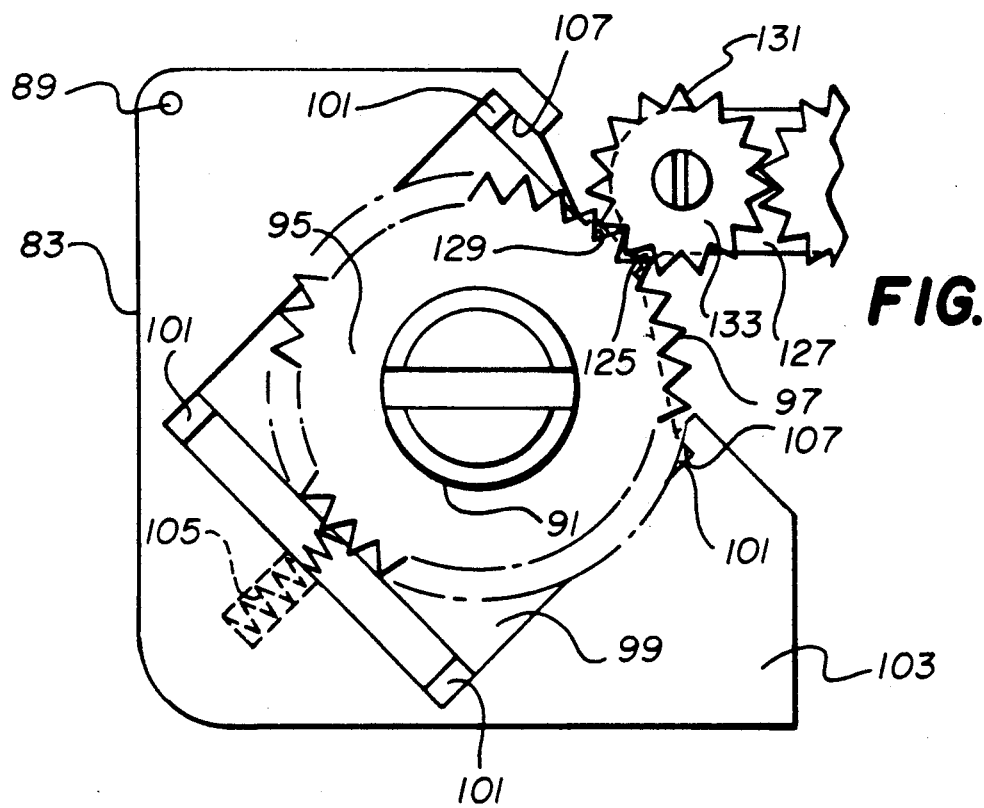
FIG. 19 is a plan view of the apparatus.

When the carrier 83 is swung to its normal position from its loading position, a nose portion 125 of a gear plate 127 fixed to the camera body 87 will push against a nose portion 129 of the slider 99 to slightly translate the slider out of its centered position against the stops 107, contrary to the urging of the spring 105. Thus, the slider 99 together with the drive spindle 95 and the coaxial gear 97 will be moved with the film cassette 1 (when the cassette is in the chamber 85) as the cassette is shifted by the datum projections 109 and 111 from its centered position to its datum position. Moreover, abutment of the respective nose portions 125 and 129 of the gear plate 127 and the slider 99 will serve to limit the extent to which the spring 105 can force the peripheral teeth 97 of the coaxial gear 97 to mesh with similar teeth 131 of a driving gear 133 rotatably supported on the gear plate as shown in FIG. 19.

The invention has been described with reference to a preferred embodiment. However, it will be appreciated that variations and modifications can be effected within the ordinary skill in the art without departing from the scope of the invention.

We claim:

1. An improved photographic camera wherein (a) a cassette carrier having a chamber for receiving a film cassette is mounted for movement relative to a camera body between a loading position in which said chamber is at least partially removed from said camera body to permit insertion and removal of the film cassette and a normal position in which the chamber is disposed in lighttight relation with the camera body, (b) a driven gear is supported on said carrier for rotating a film spool of the film cassette, and (c) a driving gear is supported on said camera body for meshing with said driven gear to rotate the driven gear when said carrier is in its normal position, and wherein the improvement comprises:
   datum means projecting from said camera body to enter said chamber when said carrier is in its normal position for shifting the film cassette to a datum position in the chamber; and
   conveyance means located on said carrier for supporting said driven gear to move with the film cassette as the film cassette is shifted to its datum position, whereby the driven gear will be maintained in proper relation with the film cassette in order to rotate the film spool.

2. The improvement as recited in claim 1, further comprising:
   respective cooperating means fixed on said camera body and said conveyance means to abut each other when said carrier is in its normal position for limiting the extent to which said driven gear and said driving gear will mesh.

3. The improvement as recited in claim 1, wherein a spindle is secured coaxially to said driven gear and projects into said chamber for engaging the film spool of the film cassette to rotate the film spool, and further comprising:
   resilient means for biasing said conveyance means to a centered position in which said spindle is substantially centered within said chamber to engage the film spool when the film cassette is inserted into the chamber, and for allowing the conveyance means to move from its centered position with the film cassette as the film cassette is shifted to its datum position.

4. The improvement as recited in claim 3, further comprising:
   respective cooperating means fixed on said camera body and said conveyance means to be spaced from each other when said carrier is in its loading position and to abut one another when the carrier is in its normal position for moving the conveyance means from its centered position with the film cassette as the film cassette is shifted to its datum position.

5. The improvement as recited in claim 4, wherein said cooperating means includes integral means for limiting the extent to which said driven gear and said driving gear will mesh when the cooperating means abut each other.

6. An improved photographic camera wherein (a) a cassette carrier having a chamber for receiving a film cassette is mounted for movement relative to a camera body between a loading position in which said chamber is at least partially removed from said camera body to permit insertion and removal of the film cassette and a normal position in which the chamber is disposed in lighttight relation with the camera body, (b) a driven gear is supported on said carrier for rotating a film spool of the film cassette, and (c) a driving gear is supported on said camera body for meshing with said driven gear to rotate the driven gear when said carrier is in its normal position, and wherein the improvement comprises:
   respective cooperating means located on said camera body and said carrier to be spaced from each other when said carrier is in its loading position and to abut one another when the carrier is in its normal position for limiting the extent to which said driven gear and said driving gear will mesh.

7. An improved photographic camera wherein (a) a cassette carrier having a chamber for receiving a film cassette is mounted for movement relative to a camera body between a loading position in which said chamber is at least partially removed from said camera body to permit insertion and removal of the film cassette and a normal position in which the chamber is disposed in lighttight relation with the camera body, (b) a driven gear is supported on said carrier for rotating a film spool of the film cassette, and (c) a driving gear is supported on said camera body for meshing with said driven gear to rotate the driven gear when said carrier is in its normal position, and wherein the improvement comprises:

spring means for forcing said driven gear and said driving gear to mesh when said carrier is in its normal position; and respective cooperating means located on said camera body and said carrier to be spaced from each other when said carrier is in its loading position and to abut one another when the carrier is in its normal position for limiting the extent to which said driven gear and said driving gear will be forced to mesh by said spring means.

8. An improved photographic camera wherein (a) a cassette carrier having a chamber for receiving a film cassette is mounted for movement relative to a camera body between a loading position in which said chamber is at least partially removed from said camera body to permit insertion and removal of the film cassette and a normal position in which the chamber is disposed in lighttight relation with the camera body, and (b) a spindle projects into said chamber for engaging a film spool of the film cassette coaxially to rotate the film spool, and wherein the improvement comprises:

datum means projecting from said camera body to enter said chamber when said carrier is in its normal position for shifting the film cassette to a datum position in the chamber; and conveyance means located on said carrier for rotatably supporting said spindle substantially centered within said chamber to engage the film spool coaxially when the film cartridge is inserted into the chamber and for movement with the film cassette as the film cassette is shifted to its datum position, whereby the spindle will be maintained in coaxial engagement with the film spool.

9. The improvement as recited in claim 8, further comprising:

resilient means for biasing said conveyance means against a stop located on said carrier to substantially center said spindle within said chamber, and for allowing the conveyance means to move with the film cassette as the film cassette is shifted to its datum position.

* * * * *